United States Patent Office 3,435,852
Patented Apr. 1, 1969

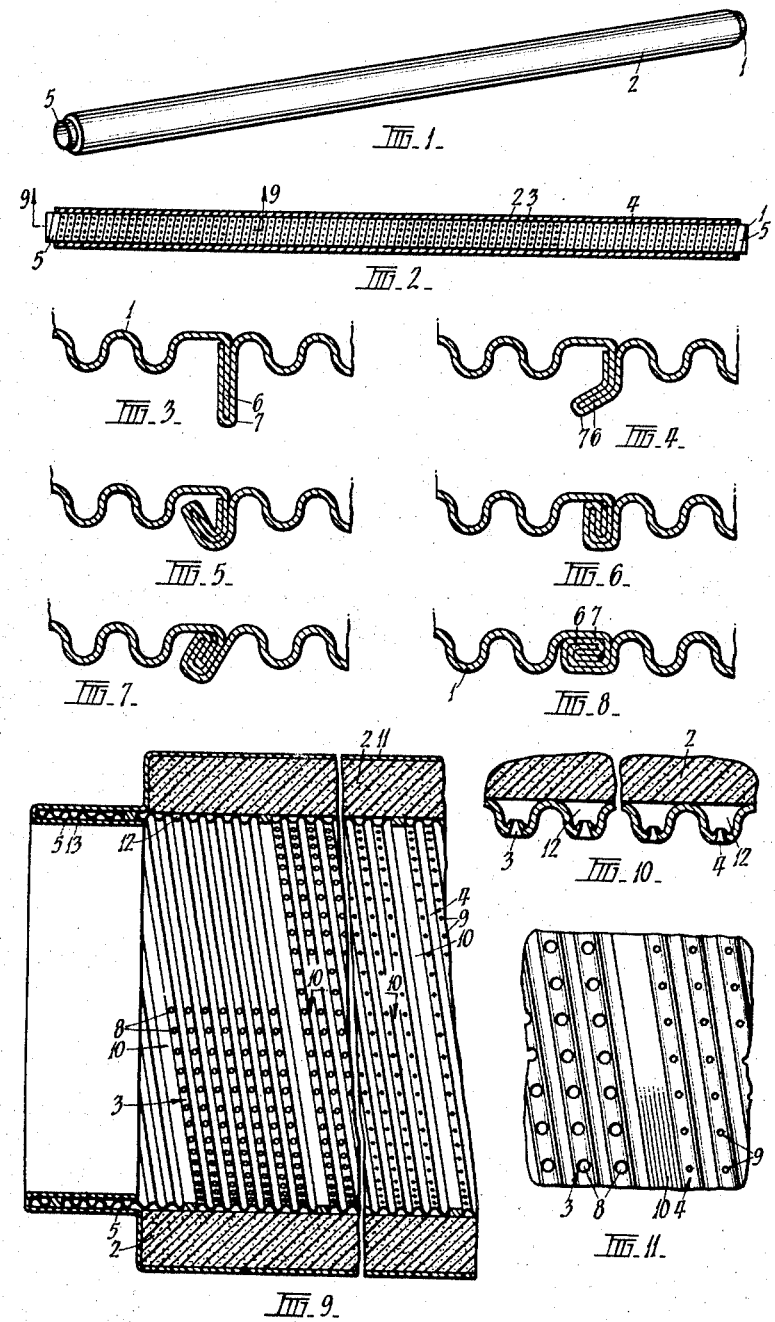

3,435,852
FLEXIBLE DUCTING
John Massey Trihey, Harkaway, Victoria, Australia, assignor to Vulcan Australia Limited, Burwood, Victoria, Australia, a corporation of Australia
Filed May 15, 1967, Ser No. 638,392
Claims priority, application Australia, May 16, 1966, 5,601/66
Int. Cl. F16l *11/16, 9/16*
U.S. Cl. 138—122
10 Claims

ABSTRACT OF THE DISCLOSURE

Flexible ducting formed of corrugated convoluted ductile material seam locked with a double locked seam.

CROSS REFERENCE TO RELATED APPLICATION

Manufacture of tube according to this invention is preferably carried out by the method and apparatus of a copending patent application Ser. No. 638,393, filed May 15, 1967. That process comprises forming in a strip of ductile material a series of corrugations, feeding the strip to a mandrel and causing it to convolute about the mandrel with adjacent edges of the convolutions of the strip overlapping one another and seam locking together the adjacent edges. After the tube is thus formed it is perforated by a perforating roller.

BACKGROUND OF INVENTION

Field of invention

This invention relates to flexible ducting and is applicable particularly to ducting for use for the carriage of air in installations such as air-conditioning installations and central-heating systems. The invention may however have application in relation to other forms of ducting such as in service ducting, automobile air ducting and in drainage.

Prior art

There is, at present, a number of different types of flexible ducting available. The most commonly used form of flexible ducting for air-conditioning is a flexible plastic ducting formed on a spirally wound base. Another form of ducting which is in use comprises a number of interfitting scale-like elements connected together to provide flexible joints between them thereby rendering the duct itself flexible. Another form of ducting at present in use comprises a tube formed by bias-winding strips of corrugated paper, aluminum foil and tarred paper to form a tube to which strength is imparted by corrugations which extend obliquely across the strip.

All of the above-mentioned constructions suffer from several disadvantages. First of all, whilst they can be readily bent they are difficult to handle in that their flexibility makes them virtually devoid of any beam strength and also requires that they be supported at frequent intervals. Furthermore, in the case of plastic tubing, due to its elastic nature it cannot be preformed to a desired curve or other desired configuration. Each of the constructions is relatively expensive and they all suffer from the serious disadvantage that sections which are to be bent cannot be pre-insulated. In the case where the known tubes are produced from bias wound strip material there is frequent failure at the seams of the tube particularly where the tube is subject to bending. The disclosure of prior U.S. Patent No. 3,094,147 shows a prior attempt to solve this problem.

Known flexible tubing constructions cannot be pre-insulated because when they are bent, bending takes place by stretching of the portion of the tube in the outer circumference of the bend and in some cases, compression of the inner circumference. Compression of the inner circumference does not interfere with the insulation but stretching of the outer circumference causes the insulation to split and thereby weaken the insulating layer and expose certain sections of the tube thereby breaking down the insulation efficiency of the tube.

SUMMARY

It is an object of this invention according to one of its aspects, to provide a cheaply constructed flexible ducting which can readily be bent to a desired configuration, but which is nevertheless of sufficient rigidity to permit ease of handling during installation. A further object of the invention is to provide a construction in which bending of the tube does not cause stretching of the outer circumference of the tube so that the tubes may be pre-insulated.

A still further object of the invention is to provide a corrugated flexible tube made from convoluted ductile strip material in which the convolutions of the strip are securely locked together.

Yet another object of a particular form of the invention is to provide a tube which effectively deadens the sound of air passing through the duct and it is also an object to provide a ducting which is effectively heat insulated.

According to one aspect of this invention, there is provided a flexible tube constructed from corrugated bias wound strip of ductile material, such as sheet metal in which the adjacent edges of convolutions of the strip are overlapped and are locked together by the process of seam locking.

The tube may also be perforated.

Preferably the locked seams of the overlapping convolutions comprise a corrugation and a flange fitting within the corrugation, said interfitting flange and corrugation being doubled over about the mid-point of their depth and then laid flat against the surface of the tube to form a double locked seam. Preferably also, the perforations of the tube are of variable size and preferably there are alternating bands along the length of the tube of small perforations and large perforations. The duct is preferably insulated by means of a layer of material of low thermal conductivity such as glass fibre or rock wool which is wrapped about the exterior of the duct and is encased in a sheet of plastic material such as polyethylene.

In order that the invention may be better understood, a preferred embodiment will be described with reference to the accompanying drawings.

BRIEF DESCRIPTION OF DRAWINGS

FIGURE 1 is a perspective view of a formed and insulated tube according to this invention, FIGURE 2 is a cross-sectional view of the tube shown in FIGURE 1, FIGURES 3 to 8 are enlarged cross-sectional views of a seam portion of the tube, showing how the seam is formed, FIGURE 9 is a cross-sectional view on an enlarged scale on the line 9—9 in FIGURE 2, FIGURE 10 is a still further enlarged cross-sectional view on the line 10—10 in FIGURE 9, and FIGURE 11 is an enlarged view of portion of the corrugated tube seen from the outside.

DESCRIPTION OF PREFERRED EMBODIMENT

As shown in FIGURES 1 and 2, the tube is formed from helically wound material 1, such as aluminium strip and is covered with an outer covering 2 of insulating material such as glass fibre or rock wool. The aluminium tubing is perforated with recurring bands 3, 4 of large and small perforations respectively. The ends 5 of the tube are unperforated and are also left clear of insulating material.

The seams which join together the edges of the convoluted strip of corrugated aluminium are locked together by a double locked seam as shown in FIGURES 3 to 8. FIGURE 3 shows the first stage in the formation of the locked seam in which a flange 6 on one edge of one convolution of the strip is mated with a deep channel 7 on the mating edge of an adjacent convolution. As shown in FIGURES 4, 5 and 6, the seam formed between the flange 6 and the channel 7 is doubled over at its midpoint to form a double seam and as shown in FIGURES 7 and 8, this double seam is then pressed over to lie flat against the wall of the tube to form the double locked seam. The process and apparatus for forming this double locked seam are described in our said copending divisional application.

The perforation of the tube and the enclosing of the tube by the insulating material is best seen from FIGURES 9, 10 and 11. As shown in those figures, the recurring bands of perforations 3 and 4 are formed of large holes 8 and small holes 9 and it will be observed also that the seam portions 10 are not perforated. As will be seen from FIGURE 10, in the preferred form of the invention the perforations are not neat holes but are rather rough outwardly directed spiked perforations formed in the troughs of the corrugations (relative to the outside of the tube). It is suspected that the formation of the perforations in this way and the communication thus formed between the interior of the duct and the dead space 12 formed between duct corrugation and the insulating layer 2 may be a factor in the improved sound deadening properties of the tubing of this invention. This characteristic is of particular importance in air-conditioning installations.

As shown in FIGURE 9, the insulating material 2 is enclosed in an impervious film 11 which is preferably of a plastic material such as polyethylene. This film is preferably slightly stretched to firmly encase the insulating material. At the ends 5 of the tube, where there is no insulation, the film is necked down onto the aluminium tubing and the end is tucked in as shown at 13. It will be appreciated that as shown in the drawing the formation of this end is somewhat stylised but we have nevertheless found that it is possible to make quite a neat plain section at the end of the tube and this greatly facilitates the joining together of two sections of tube. The wrapping of the tube in the insulating material and the encasing of the tube and insulation within the outer polyethylene casing may be performed by any suitable means but preferably it is carried out in accordance with the process described in our copending application Ser. No. 638,393.

It is not necessary that the outer sheath be of plastic film. Other materials may be used and there may be instances in which it is advantageous to sheath the insulated tube with another tube. Thus a further larger diameter tube according to this invention may be used as the sheath. In such a case the outer tube would preferably be not perforated.

The tubing above described is very suitable for use in heating and air-conditioning installations due to the favourable sound deadening characteristics previously stated and due to the fact that it is possible to bend the tubing without bursting the locked seams or splitting the insulation along the outer circumference of the bend. The reason why this is possible is not altogether clear but our observations have shown that when tubing according to this invention is bent, the bending takes place by compression of the corrugations on the inside radius of the bend rather than by extension or opening out of the corrugations on the outside radius. Our observations indicate that it is only after the corrugations on the inside radius have virtually fully closed up that any elongation or straightening out of the corrugations on the outside radius takes place. Since the insulating material can readily accommodate compression but cannot accommodate extension this renders the bending of the pre-insulated tube possible. A further advantage of tubing according to the invention is that is has reasonable beam strength and can therefore be conveniently handled in lengths suitable for most installations. For reasonable beam strength and bending facility we believe that the corrugations should be of relatively open wave form and that the ratio of the amplitude of the wave to the period should not be more than about 2. Preferably it is about 1.

The particular tubing described above was formed from aluminium strip of thickness approximately .006", with a glass fibre for rock wool insulation. It will be appreciated however that other materials may be used in the formation of the tubing and that in some applications it is not necessary that the tubing be insulated. Such variations and modifications to the construction will therefore be understood as coming within the spirit and scope of the invention.

I claim:

1. A flexible tube constructed from bias wound corrugated strip of ductile material with adjacent edges of convolutions of the strip overlapped and locked together by a locking seam wherein the locked seam of the overlapping convolutions comprise a corrugation and a flange fitting within the corrugation, said interfitting flange and corrugation being doubled over about the mid-point of their depth and then laid flat against the surface of the tube to form a double locked seam.

2. A flexible tube constructed from bias wound corrugated strip of ductile material with the adjacent edges of convolutions of the strip overlapped and locked together by the process of seam locking wherein the tube is perforated.

3. A flexible tube as claimed in claim 2, further characterized in that the perforations are outwardly directed pierced holes.

4. A flexible tube as claimed in claim 2, further characterized in that the perforations of the tube are of varied size.

5. A flexible tube as claimed in claim 3, further characterized in that the perforations of the tube are of varied size.

6. A flexible tube as claimed in any of claims 1–5, 8 and 9, further characterized in that there are alternating bands of large perforations and small perforations along the length of the tube.

7. A flexible tube as claimed in any of claims 1–5, 8 and 9, further characterized in that the tube is covered on the outside with an insulating layer of material of low thermal conductivity which in turn is encased in an outer covering of impervious material.

8. A flexible tube constructed from bias wound corrugated strip of ductile material with adjacent edges of convolutions of the strip overlapped and locked together by a locking seam wherein the locked seam of the overlapping convolutions comprises a corrugation and a flange fitting within the corrugation, said interfitting flange and corrugation being doubled over about the midpoint of their depth and then laid flat against the surface of the tube to form a double locked seam, and wherein said tube is perforated.

9. A flexible tube as claimed in claim 8, further characterized in that the perforations are spiked holes formed without the removal of metal from the strip.

10. A flexible tube as claimed in any of claims 1-5, 8 and 9, further characterized in that said tube is provided with alternating bands of large perforations and small perforations along the length thereof, and said tube is covered on the outside with an insulating layer of material of low thermal conductivity which in turn is encased in an outer covering of impervious material.

References Cited

UNITED STATES PATENTS

| | | | |
|---|---|---|---|
| 998,827 | 7/1911 | Armstrong | 138—136 |
| 1,315,548 | 9/1919 | Fletcher et al. | 138—135 |
| 2,936,792 | 5/1960 | MacCracken et al. | 138—154 |

HENRY S. JAUDON, *Primary Examiner.*

U.S. Cl. X.R.

220—76; 138—135, 154

PO-1050
(5/69)

UNITED STATES PATENT OFFICE
CERTIFICATE OF CORRECTION

Patent No. 3,435,852            Dated April 1, 1969

Inventor(s) John Massey Trihey

It is certified that error appears in the above-identified patent and that said Letters Patent are hereby corrected as shown below:

Column 4, line 44, delete "the".
Column 4, line 46, "the process of seam locking" should read --a locking seam--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents